Patented Feb. 13, 1945

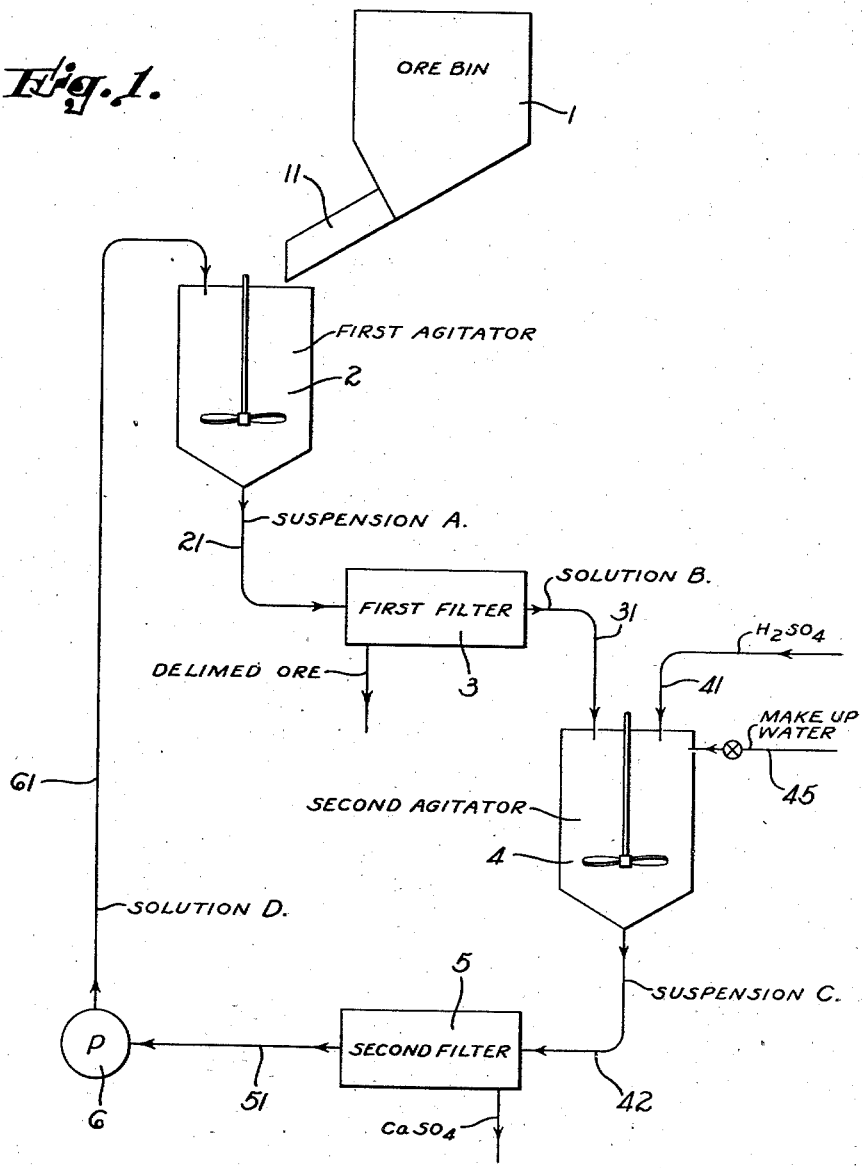

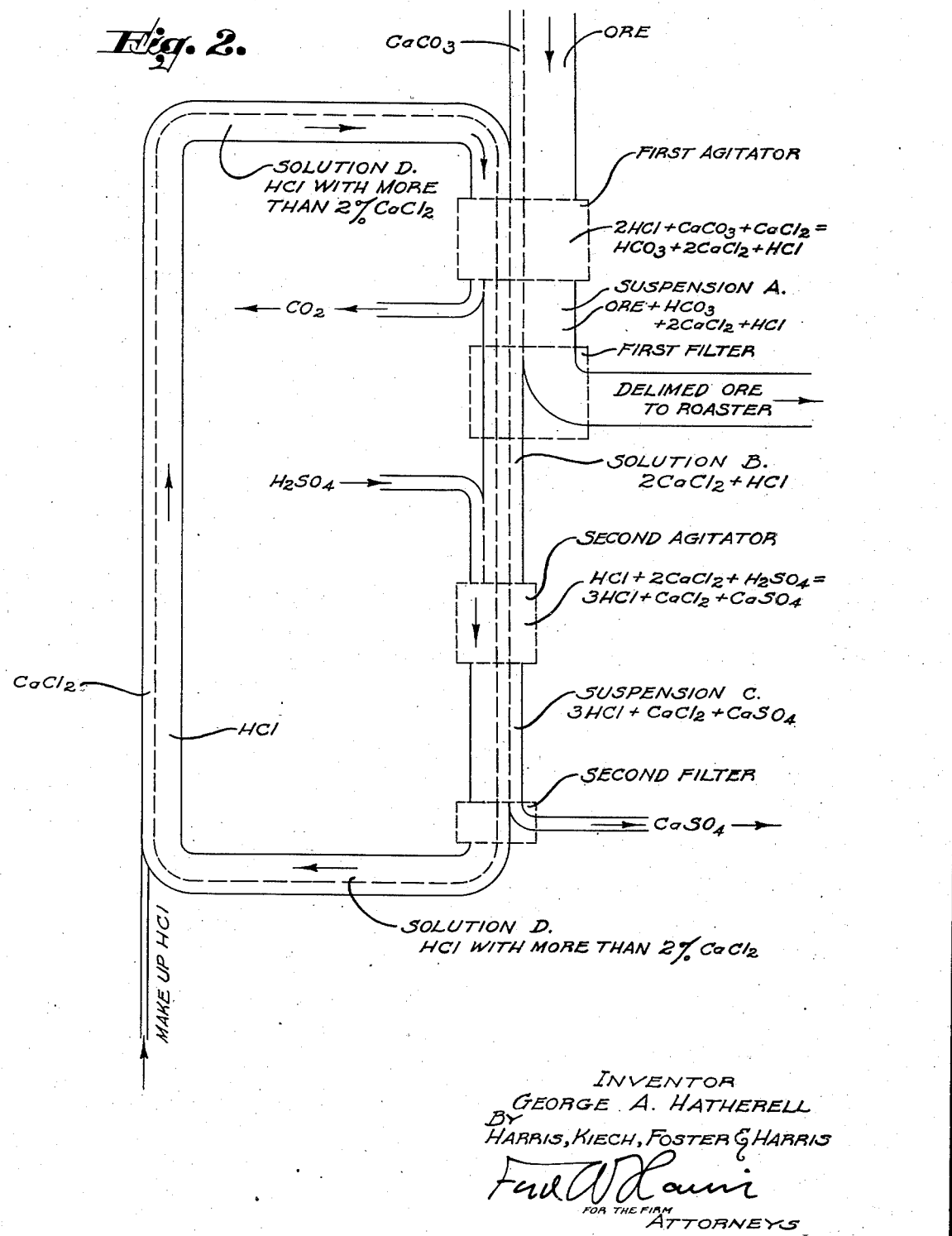

2,369,349

UNITED STATES PATENT OFFICE 2,369,349

PROCESS OF REMOVING LIME FROM ORES

George A. Hatherell, Roscoe, Calif., assignor to Frank A. Garbutt, Los Angeles, Calif.

Application February 20, 1942, Serial No. 431,638

6 Claims. (Cl. 23—122)

My invention relates to a process for producing water soluble metallic salts by leaching ores of vanadium or other metals which form such salts upon being roasted with sodium chloride.

The process further relates to a method by which such ores may have their lime content reduced prior to roasting, so that the roasting process may be economically applied to ores having a high lime content.

The oxide vanadium, chromium, and uranium ores such as are found in Colorado and Utah contain amounts of lime varying from a fraction of a per cent to sometimes ten per cent or more. I find that when the lime content rises above about 2% calcium carbonate, the ore begins to show troublesome characteristics during treatment. The process conventionally used for recovery of vanadium from these ores is as follows:

The ore is subjected to an oxidizing roast to convert the vanadium to a state of oxidation corresponding to $V_2O_5$. This roast is preferably conducted in the presence of sodium chloride which serves as a source of alkali for the formation of sodium vanadate. The sodium vanadate thus formed may be subsequently removed by a simple water leach.

The use of sodium chloride during the roast is also advantageous in that it promotes the formation of complex silicates which serve to fix the lime. The chemistry of this calcium fixation by the silicates is complex, but it may be generally stated that the greater the quantity of lime in the ore, the greater the difficulty experienced in forcing complete absorption of the calcium by the silicate present in the ore. It is true that the absorption of the calcium can be forced to completion by the use of long roasts, excessive quantities of sodium chloride, and high temperatures, but under these conditions there is a steady and easily accelerated absorption of vanadium at the same time, and the vanadium thus absorbed in the complex silicate is completely unamenable to leaching with water.

In the absence of complete fixation of the calcium during roasting, difficulties are experienced during the subsequent step of water leaching, since under these conditions insoluble calcium vanadate forms in the body of the ore during leaching. This compound, while not entirely insoluble, is so limited in solubility that there is a loss of vanadium proportional to the amount of calcium ion present in the ore. This effect becomes very apparent when the lime content in the original ore reaches about 5%, and is definitely troublesome in the case of ores containing substantially less than 5% of lime.

It is an object of this invention to provide a method of treating vanadium ores and the like in which substantially all of the lime is removed prior to roasting. In accordance with my invention, this lime may be removed by an acid leach, such as hereinafter described.

It is an object of my invention to provide a process by which the lime content of the ores may be reduced so that they can be treated by the sodium chloride roasting process or other processes in which the lime might give trouble.

The operation of my process can be better understood by reference to the following description of one way in which it may be operated on ores containing a large lime and a small vanadium content.

In the drawings, Fig. 1 is a schematic drawing of the apparatus used, and Fig. 2 is a flow sheet. In Fig. 1 I show an ore bin 1, first agitator 2, a first filter 3, a second agitator 4, a second filter 5, and a pump 6.

Ore in a pulverized condition carried in the ore bin 1 is delivered through a chute 11 to the first agitator 2 in which the ore is agitated in an aqueous solution, herein called solution D, to form a suspension called suspension A, which is passed through a pipe 21 to the first filter 3. Delimed ore is separated from suspension A, leaving as a filtrate solution B which passes through a pipe 31 to the second agitator 4 in which solution B is mixed with sulphuric acid delivered through pipe 41. A suspension C is formed in agitator 4 which is passed to the second filter 5 through a pipe 42. In the filter 5 water insoluble calcium sulphate $CaSO_4$ is separated from suspension C, and the filtrate solution D is passed to the pump 6 through a pipe 51 and delivered by the pump 6 through a pipe 61 into the first agitator 2. Makeup water to keep the volume of the solutions fairly constant, in spite of water losses in the delimed ore, and calcium chloride may be supplied at any convenient point, for example, into the agitator 4 through a pipe 45.

The process may be conducted in other apparatus than that shown diagrammatically in the drawings and above described, and can only be conducted in this apparatus if the apparatus is operated in a certain manner.

Obviously, some of the elements 1 to 6, inclusive, may be provided in duplicate or triplicate so that the operation may be continuous even if one of these pieces of apparatus is shut down for any purpose. Also, in handling large bodies of ore, a batch process may be more convenient than a continuous process, especially as the leaching time may be rather long. In general, the following comments apply equally well to either continuous or batch operation.

It is most important that the calcium chloride in solution B shall not be entirely converted into calcium sulphate in the agitator 4. In practice it is usually advisable that the suspension C contain 5% or more of calcium chloride. The solution D may then contain about this proportion of calcium chloride. If the proportion of calcium chloride in the solution D is more than 5%, the process works satisfactorily, but, for reasons of convenience, on ores with which I am familiar about 5% is a reasonable value.

The leaching action of solution D should be preferably conducted so that solution B is never a saturated solution of calcium chloride and preferably contains some free hydrochloric acid, as by this procedure substantially all the lime in the ore will be converted into calcium chloride. Since solution B is never fully saturated with calcium chloride and chloride is converted to sulphate in the agitator 4, solution D is never saturated with calcium chloride, and thus can dissolve and carry away the calcium chloride formed in the agitator 2.

It is, however, essential that the rate at which sulphuric acid is fed through the pipe 41 into the agitator 4 be kept sufficiently low to leave a substantial amount of calcium chloride in the solution D.

It is well known that sulphuric acid provides a far more economical source of hydrogen ion than does hydrochloric acid or other mineral acid. On the other hand, sulphuric acid is not suitable for direct application as a leaching agent, since it effects conversion of the calcium carbonate into calcium sulphate, which is itself insoluble and would remain in the ore. I have determined in this respect that calcium sulphate causes substantially the same troubles in subsequent roasting and leaching that are occasioned by the presence of calcium carbonate, and hence the direct treatment with sulphuric acid is without benefit.

I have further discovered that simple metathesis of sulphuric acid with an equivalent amount of calcium chloride to produce a solution comprising hydrochloric acid does not yield an efficient leaching solution. For example, I found that the lime content of a given ore was reduced from 5% to less than 0.1% by a leach with hydrochloric acid in quantity about 10% greater than that chemically equivalent to the lime, followed by a thorough washing. A leaching solution was then manufactured by the metathesis of equivalent quantities of sulphuric acid and calcium chloride followed by filtration to remove the precipitated calcium sulphate, substantially all the calcium chloride being converted into calcium sulphate. This solution contained substantially the same concentration of hydrochloric acid as did the first, but when applied to a similar sample of ore in the same manner the lime content of the ore was reduced to only 3.9%. In other words, the hydrochloric acid as formed by metathesis of equivalent quantities of sulphuric acid and calcium chloride left a residual lime content some thirty-nine times greater than did the pure hydrochloric acid.

I have found that the failure of such a solution to produce the desired leaching is due in part at least to the precipitation of calcium sulphate in or on the ore during leaching. This is not only disadvantageous in that the conversion of the calcium carbonate to calcium sulphate is without beneficial effect, as discussed above, but in addition the sulphate apparently tends to coat or mask the ore against further action of the acid. Other effects may also be involved.

I have found that such defects in the leaching operation of a solution prepared from sulphuric acid and calcium chloride may be largely or even completely overcome by providing a substantial concentration of calcium and/or hydrogen ion in the leaching solution so that the relative changes in calcium and hydrogen ion concentration during leaching are substantially minimized and so that the equilibria in the leaching solution are not greatly disturbed by the reactions during leaching.

To illustrate, a solution of hydrochloric acid prepared by the metathesis of an equivalent amount of sulphuric acid and calcium chloride with subsequent removal of the precipitate contains a definite but relatively small proportion of calcium in the form of dissolved calcium sulphate. The solubility of this calcium sulphate is somewhat enhanced by the presence of the hydrogen ion which tends to form bisulphate. On utilizing this solution for leaching, the concentration of the calcium ion increases manyfold and the concentration of the hydrogen ion drops manyfold, only a slight excess of hydrogen ion being provided. The equilibrium conditions in the leaching solution are thereby profoundly affected. The readjustment of the equilibria necessarily involves the precipitation of calcium sulphate, since both the increase in calcium ion concentration and the decrease in hydrogen ion concentration tend to decrease the solubility of calcium sulphate.

By starting with a leaching solution, however, which contains several per cent of dissolved calcium ion, the perturbing effect of a few additional per cent as derived from the leaching is greatly minimized. Again, by using a substantial excess of acid, for example, from 50 to 100% excess or more, the relative change in hydrogen ion concentration is also greatly minimized. While I may utilize either of these effects separately to increase the extraction efficiency of such solutions, I, in general, prefer to use them in combination providing both excess quantities of hydrogen ion and substantial quantities of dissolved calcium ion in the leaching solution.

As an example of my process, a calcium chloride solution was treated with sulphuric acid in an amount sufficient to produce a hydrochloric acid concentration of about 3.8%. The calcium chloride was taken in such excess that the solution after removal of the precipitated calcium sulphate still contained about 7.2% calcium chloride. This solution was applied to the leaching of an ore containing about 5% lime as calcium carbonate and was used in the proportion of about two pounds of solution to a pound of ore. Under these conditions the hydrochloric acid content of the leaching solution was about double that theoretically necessary. Following leaching and washing in a manner similar to that used in connection with the above mentioned tests, the leached ore was found to have a lime content calculated as calcium carbonate of only 0.2%. This compares very favorably with the 0.1% obtained with the use of pure hydrochloric acid and is very much lower than the 3.9% lime content which is obtained when employing the solution obtained by metathesis of equivalent quantities of calcium chloride and sulphuric acid.

The spent liquor from this last experiment was found to contain 9.93% calcium chloride and approximately 2.0% HCl. These concentrations do not depart greatly from the concentration of the original leaching solution and indicate that the equilibria were substantially undisturbed during extraction.

In practice I find that various concentrations of calcium chloride may be used in leaching solutions to obtain advantageous results in the way of suppressing precipitation and the like during leaching, or, in general, to increase the efficiency of the leaching solution. The concentration of calcium chloride thus employed should in general be greater than 2% and preferably greater than 5%. I find that concentrations of 5 to 10% may be used to excellent advantage, and even higher concentrations may be employed if desired. With regard to the hydrochloric acid content of the leaching solution, I in general prefer to employ concentrations of from 1 to 10%, although this range may be extended if desirable. In general, I propose to utilize such quantity of the leaching solution that the hydrochloric acid is present in substantial excess of the lime to be extracted, although, if the concentration of $CaCl_2$ is sufficiently high, adequate leaching may be obtained when using an amount of acid approximately equivalent to the lime. The best results are obtained when using at least 50% and preferably 100% excess of acid over that theoretically equivalent to the lime. I also find it advantageous to adjust the hydrochloric acid concentration in the leaching solution or the amount of the leaching solution with respect to the amount of ore to be leached, or both, with reference to the desired concentration of the hydrochloric acid in the spent liquor, since, for best results, the spent liquor should not contain materially less than 1 to 2% of hydrochloric acid.

The spent liquor may be readily regenerated by the addition of sulphuric acid in an amount substantially equivalent to the hydrochloric acid consumed during leaching. The extracted calcium is thereby precipitated as calcium sulphate, and hydrogen ion is again formed in quantity equal to that used up in the extraction reactions. A residual quantity of calcium chloride is also present in the liquor thus regenerated corresponding to the calcium chloride concentration in the original leaching solution. The regenerated liquor thus corresponds in all its essential aspects to the original leaching solution and may be used to treat further quantities of the ore in an identical fashion. In such a continuous recycling process practically no calcium chloride is consumed after the process is once started, and sulphuric acid thus represents the only reagent which is consumed in the cycle. Small quantities of $CaCl_2$ may occasionally be added to make up for a slight loss arising from the slight consumption of HCl by impurities other than lime. By suitable handling methods the solution loss per cycle may be made very small, as low as 2%. The recycle process as described thus represents a very efficient and economical process for the deliming of ore.

There is another advantage resident in the cyclic reuse of the leaching solution. There is a certain percentage of vanadium compound in ores of the type here concerned which is soluble in weak acid solution. If a fresh acid solution is applied to each batch of ore, there is a constant loss of vanadium value arising from this source. Where the same solution is in constant reuse, however, no such loss appears after an initial period in which the solution builds up to its equilibrium concentration of vanadium.

When operating on vanadium and similar ores of substantial lime content, I find it advisable to reduce the lime content prior to roasting to a value not materially more than 2.5%, calculated as $CaCO_3$. Recovery of vanadium by an oxidizing roast becomes feasible at this lime content, although the roasting process and subsequent leaching may be still further benefited by further reductions in lime content, e. g., to the 0.1 to 0.2% obtainable by my leaching process. In practice the benefits of lime removal should be economically balanced against the cost of deliming to reach a value for permissible lime which represents the economically optimum value. This value may be maintained in practice by suitable control of the leaching operations but is most advantageously realized by blending untreated and delimed ores. For example, in working on a vanadium ore containing 5% lime as calcium carbonate, I found that the most economical recovery of vanadium was afforded by leaching half the ore to a 0.2% lime content and blending this leached ore back with the unleached half to produce a mix containing about 2.5% lime. The vanadium was readily and without difficulty recoverable from this mix by roasting the mix in the presence of air and sodium chloride, and leaching the vanadium from the roasted ore with water.

The reasons given above for the calcium chloride carried in solution D being so effective in preventing the precipitation of calcium sulphate probably fully explain this phenomenon. In addition, it may be pointed out that since calcium sulphate is not very soluble, it may be regarded as completely disassociated in solution D. The concentration of calcium ion multiplied by the concentration of sulphate ion is then a constant, and any increase in calcium ion content in solution D results in a proportionate decrease of the possible sulphate ion content. If we increase the calcium ion concentration ten times, the sulphate ion concentration drops to 10% of its previous value. If, for example, solution D contains 1% of calcium sulphate in solution and the concentration of calcium chloride is increased five times, the amount of calcium sulphate that solution D will carry is reduced to 0.2% or below. By maintaining a substantial proportion of calcium chloride in solution D, it is possible to reduce the proportion of calcium sulphate which this solution can carry over to the leaching operation in agitator 2 to such a degree that the calcium sulphate is not troublesome.

While roasting with sodium chloride is now the most common practice of treating vanadium or other ores if the calcium content is reduced by the use of my process, other roasting agents or processes are available and satisfactory. Sodium carbonate and other sodium or potassium salts may be used to produce a water soluble salt of the metal carried in the ore, for example, a sodium of potassium vanadate. All the salts which may be used in the roasting process to produce water soluble salts may be generally considered as suitable fluxes.

This application is a continuation of my application Serial No. 246,484, filed December 17, 1938.

It is to be understood that the details of the above examples are illustrative only and that various modifications thereof may be practiced which embody my invention as defined by the scope of the appended claims.

I claim as my invention:

1. A process of removing lime from ores containing such lime associated with metalliferous values, which comprises: leaching said ores with a primary aqueous solution of calcium chloride, the solution containing a low concentration of calcium chloride, said solution carrying hydrochloric acid which acts upon the lime to form additional calcium chloride, thus increasing the proportion of calcium chloride and producing a secondary relatively highly concentrated solution of calcium chloride; separating said secondary solution from the delimed ore; adding sulphuric acid to said secondary solution in an amount sufficient to convert a portion only of the calcium chloride of said secondary solution into calcium sulphate, the amount of acid so added being approximately only that needed to reduce the calcium chloride content of said secondary solution to that of said primary solution, thus producing a solution containing hydrochloric acid; and separating the major portion of said calcium sulphate from said solution, thus forming a primary solution which may be used to leach additional ore.

2. A process of producing a water-soluble salt of a metal from an ore containing said metal and lime, which comprises: leaching said ores with a primary aqueous solution of calcium chloride, the solution containing a low concentration of calcium chloride, said solution carrying hydrochloric acid which acts upon the lime to form additional calcium chloride, thus increasing the proportion of calcium chloride and producing a secondary relatively highly concentrated solution of calcium chloride; separating said secondary solution from the delimed ore; adding sulphuric acid to said secondary solution in an amount sufficient to convert a portion only of the calcium chloride of said secondary solution into calcium sulphate, the amount of acid so added being approximately only that needed to reduce the calcium chloride content of said secondary solution to that of said primary solution, thus producing hydrochloric acid for use in said leaching; separating the major portion of said calcium sulphate from said solution, thus forming a primary solution which may be used to leach additional ore; roasting the delimed ore with a suitable flux; leaching the roasted ore with water to remove the desired metallic salt; and treating the solution so produced to recover the metallic values therefrom.

3. A process as in claim 1 in which leaching of the ore is so conducted that said secondary solution contains a substantial amount of hydrochloric acid which has not been entirely consumed in forming calcium chloride during said leaching.

4. A process as in claim 2 in which leaching of the ore is so conducted that said secondary solution contains a substantial amount of hydrochloric acid which has not been entirely consumed in forming calcium chloride during said leaching.

5. A process as in claim 1 in which the proportion of calcium chloride in said primary solution is in excess of 2%.

6. A process as in claim 2 in which the proportion of calcium chloride in said primary solution is in excess of 2%.

GEORGE A. HATHERELL.